(12) United States Patent
Naqi et al.

(10) Patent No.: US 8,290,673 B2
(45) Date of Patent: Oct. 16, 2012

(54) SYSTEM AND METHOD OF DETECTING A FAILED FRICTION ELEMENT

(75) Inventors: Syed Naqi, Dearborn, MI (US); Ali K. Naqvi, White Lake, MI (US); Lawrence A. Kaminsky, White Lake, MI (US); Jy-Jen F. Sah, West Bloomfield, MI (US); James R. Bartshe, Plymouth, MI (US); Peter E. Wu, Lake Forest, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/014,906

(22) Filed: Jan. 27, 2011

(65) Prior Publication Data

US 2012/0065855 A1 Mar. 15, 2012

Related U.S. Application Data

(60) Provisional application No. 61/383,019, filed on Sep. 15, 2010.

(51) Int. Cl.
*G06F 7/00* (2006.01)

(52) U.S. Cl. .......................................................... 701/67
(58) Field of Classification Search .................... 701/67, 701/70–71, 78–7, 849, 78–79
See application file for complete search history.

(56) References Cited

U.S. PATENT DOCUMENTS

| 6,283,239 B1* | 9/2001 | Tsukamoto et al. | 180/65.25 |
| 2006/0108162 A1* | 5/2006 | Tabata et al. | 180/65.2 |
| 2008/0173487 A1* | 7/2008 | Kamada et al. | 180/65.4 |
| 2009/0063000 A1* | 3/2009 | Kodama et al. | 701/75 |

* cited by examiner

*Primary Examiner* — Hussein A. Elchanti
(74) *Attorney, Agent, or Firm* — Quinn Law Group, PLLC

(57) ABSTRACT

A system includes a friction element having a driving mechanism and a driven mechanism. At least one of the driving mechanism and the driven mechanism is configured to rotate. A drive unit is configured to provide a torque to at least one of the driving mechanism and the driven mechanism. A control processor is configured to diagnose a friction element failure based on a slip speed, which is the difference between rotational speeds of the driving mechanism and the driven mechanism. The control processor is further configured to induce a slip condition as part of a shift process and diagnose the friction element failure if the derived slip speed is substantially zero after inducing the slip condition.

20 Claims, 2 Drawing Sheets

US 8,290,673 B2

SYSTEM AND METHOD OF DETECTING A FAILED FRICTION ELEMENT

CROSS-REFERENCE TO RELATED APPLICATIONS

This application claims the benefit of U.S. Provisional Patent Application No. 61/383,019, filed Sep. 15, 2010, which is hereby incorporated by reference in its entirety.

TECHNICAL FIELD

The invention relates to a diagnostic system for a vehicle.

BACKGROUND

Passenger and commercial vehicles use various friction elements, such as clutch and brake assemblies, to impart or prevent rotational motion of a driving mechanism relative to a driven mechanism when the driving mechanism and driven mechanism are in an engaged position. That is, in a clutch assembly, the driving mechanism can impart rotational motion to the driven mechanism, and in a brake assembly, the driven mechanism can slow or stop the rotation of the driving mechanism. When in a disengaged position, however, the driving mechanism and driven mechanism are free to rotate at different speeds. A control module generates and transmits control signals to command the driving mechanism and the driven mechanism to either engage or disengage one another. However, various factors may cause the friction element to become stuck in either the engaged or disengaged position, which can greatly affect the operation of the vehicle. These factors that cause friction element failures are often difficult to detect.

SUMMARY

A system includes a friction element having a driving mechanism and a driven mechanism. At least one of the driving mechanism and the driven mechanism is configured to rotate. A drive unit is configured to provide a torque to at least one of the driving mechanism and the driven mechanism. A control processor is configured to diagnose a friction element failure based on a slip speed defined by the difference between rotational speeds of the driving mechanism and the driven mechanism. The control processor is further configured to induce a slip condition as part of a shift process and diagnose the friction element failure if the derived slip speed is substantially zero after inducing the slip condition.

Another system includes a friction element having a driving mechanism and a driven mechanism. At least one of the driving mechanism and the driven mechanism is configured to rotate. A drive unit is configured to provide a torque to at least one of the driving mechanism and the driven mechanism. At least one sensor is configured to directly or indirectly measure the rotational speed of at least one of the driving mechanism and the driven mechanism. A control processor is configured to determine an expected slip speed, derive a slip speed from the rotational speeds measured by the sensors, compare the derived slip speed to the expected slip speed, and diagnose a friction element failure based on a difference between the derived slip speed and the expected slip speed.

A diagnostic system includes at least one speed sensor configured to measure a rotational speed of at least one of a driving mechanism and a driven mechanism of a friction element. A control processor is configured to diagnose a friction element failure based on a derived slip speed that is defined by a difference between the rotational speed of the driving mechanism and the rotational speed of the driven mechanism. The control processor is further configured to induce a slip condition as part of a shift process and diagnose the friction element failure if the derived slip speed is substantially zero after inducing the slip condition.

The above features and advantages and other features and advantages of the present invention are readily apparent from the following detailed description of the best modes for carrying out the invention when taken in connection with the accompanying drawings.

DETAILED DESCRIPTION

An exemplary system is provided that is able to diagnose whether a friction element, such as a clutch or brake, has failed in an unintended position. The system includes the friction element having a driving mechanism and a driven mechanism. The driving mechanism, the driven mechanism, or both, are configured to rotate. A drive unit is configured to provide a torque to the driving mechanism and/or the driven mechanism. A control processor is configured to diagnose a friction element failure based on a slip speed defined by the difference between rotational speeds of the driving mechanism and the driven mechanism. For instance, the control processor may induce a slip condition as part of a process of disengaging the friction element, such as during a shift action. The control processor may diagnose the friction element failure if the derived slip speed is substantially zero after inducing the slip condition. The control processor may compare the derived slip speed to a threshold value to determine whether the friction element disengaged during, for instance, the shift action. Alternatively, the control processor may compare the derived slip speed to an expected slip speed, and diagnose a friction element failure based on a difference between the derived slip speed and the expected slip speed. As described herein, the control processor may diagnose the friction element failure if the derived slip speed is substantially zero after the disengagement process has occurred, where some amount of non-zero slip speed was expected to have been induced.

The system and methods disclosed herein may be used to detect friction element failures caused by various factors. For example, the friction element may be moved into an engaged position or a disengaged position using a hydraulic system having actuators, such as pressure control solenoids. A problem with the hydraulic system, such as debris in the actuator, may cause the actuator to remain open and keep the friction element in the engaged position. Alternatively, the driving mechanism and the driven mechanism may become welded together under high heat conditions. The system disclosed herein is able to detect these and other types of friction element failures.

Figure 1:
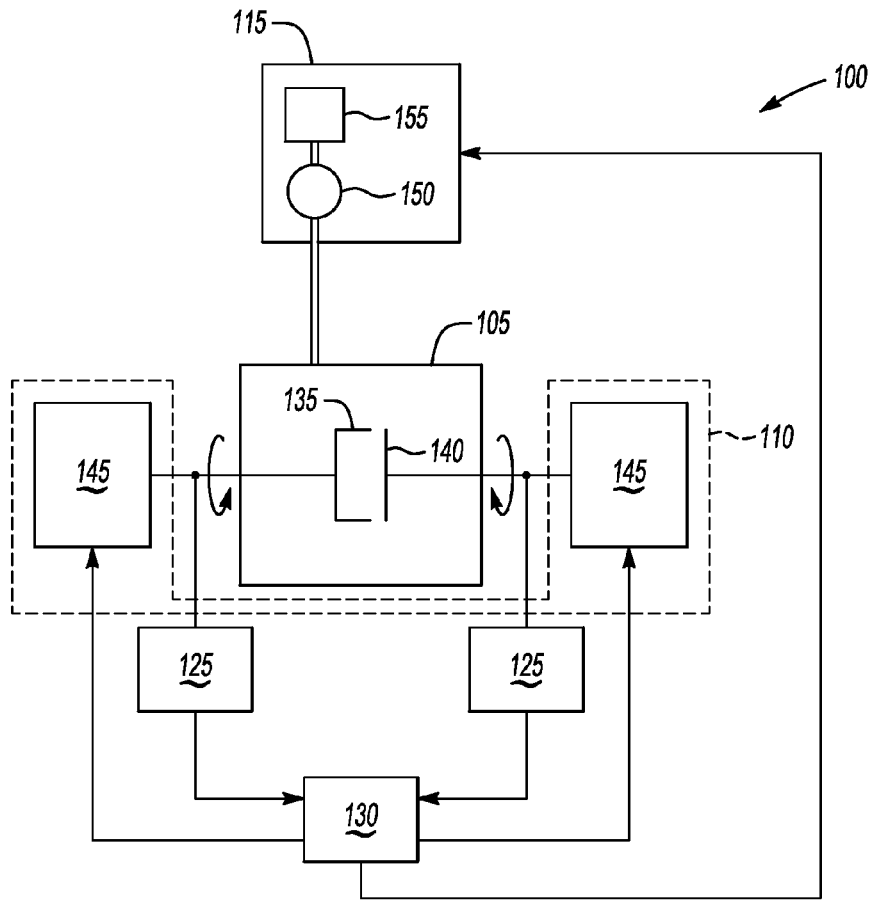
FIG. 1 is a schematic of an exemplary system configured to diagnose a friction element failure.

FIG. 1 illustrates an exemplary system 100 that is able to diagnose a failed friction element 105, such as a clutch or brake. The system 100 may take many different forms and include multiple and/or alternate components and facilities. While an exemplary system 100 is shown in the Figures, the exemplary components illustrated in the Figures are not intended to be limiting. Indeed, additional or alternative components and/or implementations may be used.

The system 100 includes a friction element 105, a drive unit 110, a hydraulic system 115, a plurality of speed sensors 125, and a control processor 130. The system 100 may be implemented in a vehicle, such as a passenger or commercial automobile. Further, the system 100 may be implemented in a hybrid electric vehicle including a plug-in hybrid electric vehicle (PHEV) or an extended range electric vehicle (EREV), a gas-powered vehicle, a battery electric vehicle (BEV), or the like.

The friction element 105 may include any device having two or more mechanisms that can be selectively engaged and disengaged. For instance, the friction element 105 may include a clutch or brake assembly. In one exemplary implementation, the friction element 105 includes a driving mechanism 135 and a driven mechanism 140 that are configured to rotate at substantially the same speeds when engaged. Both the driving mechanism 135 and the driven mechanism 140 may include a plate disposed on a shaft. In a clutch assembly, the driving mechanism 135 drives the driven mechanism 140 when engaged. That is, both the driving mechanism 135 and the driven mechanism 140 are configured to rotate about their respective shafts, and the driving mechanism 135 causes the driven mechanism 140 to rotate at substantially the same speed as the driving mechanism 135 when engaged. In a brake assembly, however, the driven mechanism 140 is fixed (e.g., not able to rotate relative to the vehicle), which causes the driving mechanism 135 to slow when the driving mechanism 135 and driven mechanism 140 are engaged. Therefore, in a brake assembly, the driving mechanism 135 will eventually slow to a stop (e.g., a rotational speed of zero) when engaged with the driven mechanism 140.

The drive unit 110 may be used to impart motion to one or more parts of the friction element 105. For instance, the drive unit 110 may include a torque actuator 145 such as an electric motor and/or generator that provides a torque to the driving mechanism 135, causing the driving mechanism 135 to rotate. Alternatively, the drive unit 110 may include another torque actuator 145 that is configured to provide a torque to the driven mechanism 140. This way, the driving mechanism 135 and driven mechanism 140 may be rotated at similar speeds prior to engaging the driving mechanism 135 with the driven mechanism 140.

The hydraulic system 115 may be used to control the engagement and disengagement of the components of the friction element 105. For instance, the hydraulic system 115 may include one or more actuators 150, such as pressure control solenoids, and one or more pumps 155. The pump 155 may provide fluid pressure to the actuators 150, and the actuator 150 may act as a valve. Accordingly, in response to a control signal, the actuator 150 may open and allow the fluid to flow from the pump 155 to the friction element 105. In particular, the fluid may flow to the driving mechanism 135, causing the driving mechanism 135 to engage the driven mechanism 140. Alternatively, or in addition, fluid may flow from the pump 155 to the driven mechanism 140, causing the driven mechanism 140 to engage the driving mechanism 135.

The actuator 150 may also prevent fluid flow to the friction element 105. For example, in response to or in the absence of a control signal, the actuator 150 may close, preventing fluid from flowing from the pump 155 to the friction element 105. Without fluid pressure, the driving mechanism 135 and the driven mechanism 140 may disengage from one another. The hydraulic system 115 may include any number of actuators 150 and pumps 155 to control the position of the friction element 105.

The hydraulic system 115 may be controlled by a device such as the control processor 130 or any other electronic device. In one exemplary approach, the control processor 130 may include any device configured to transmit one or more command signals to the hydraulic system 115. The command signals indicate an intended position of the friction element 105. For instance, as previously discussed, the command signals may cause the actuators 150 to open and allow fluid to flow from the pump 155 to the driving mechanism 135, the driven mechanism 140, or both. The command signals may further cause the actuator 150 to close, preventing fluid flow and disengaging the friction element 105. The control processor 130 may include or be in communication with a transmission control module if the friction element 105 includes a clutch assembly or a brake assembly.

The speed sensors 125 may include any device configured to directly or indirectly measure the rotational speeds of the driving mechanism 135 and the driven mechanism 140. For instance, one speed sensor 125 may be operatively disposed on a shaft of the driving mechanism 135 and another speed sensor 125 may be operatively disposed on a shaft of the driven mechanism 140. The speed sensors 125 may each be configured to output a measured speed signal representative of the measured rotational speeds of either the driving mechanism 135 or the driven mechanism 140. The speed sensors 125 may each include, for instance, an encoder or a resolver. As discussed in greater detail below, the difference between the measured rotational speeds represents the slip speed. Alternatively, the slip speed may be derived from the rotational speeds measured by the speed sensors 125. For instance, the system 100 may include a gearbox (not shown) disposed between the torque actuators 145 and the friction element 105. In this particular approach, the slip speed may be derived from a ratio between the speeds measured by the speed sensors 125. Nevertheless, the slip speed may still be the difference between the speeds of the driving mechanism 135 and the driven mechanism 140.

The control processor 130 may include any device configured to control the operation of the drive unit 110. That is, the control processor 130 may generate one or more torque signals that control the speeds at which the driving mechanism 135, driven mechanism 140, or both, rotate. Therefore, the control processor 130 may be configured to transmit the generated torque signals to the drive unit 110. The torque actuators 145, for instance, of the drive unit 110 may provide a torque to the friction element 105 that causes the driving mechanism 135, the driven mechanism 140, or both, to rotate at a speed associated with the torque signal generated by the control processor 130. As such, the torque signals generated by the control process 130 may command the torque actuators 145 to rotate at particular speeds.

The control processor 130 may further be configured to diagnose a friction element 105 failure based on the rotational speeds measured by the speed sensors 125. In one particular approach, the control processor 130 may be configured to receive the measured speed signals from the speed sensors 125 and derive the slip speed based on the measured speed signals. As mentioned above, the slip speed is defined as the difference between the rotational speeds of the driving mechanism 135 and the driven mechanism 140. With the slip speed, the control processor 130 may be configured to determine the position of the friction element 105. For instance, a slip speed of substantially zero indicates that the driving mechanism 135 and the driven mechanism 140 are rotating at the same speed, which may suggest that the friction element 105 is in the engaged position. Alternatively, a non-zero slip speed indicates that the friction element 105 is in the disengaged position because the driving mechanism 135 and driven mechanism 140 are able to rotate at different speeds.

The control processor 130 may be further configured to compare the position identified from the slip speed to the intended position. For example, as discussed above, a slip speed of substantially zero may indicate that the friction element 105 is in the engaged position. Therefore, the control processor 130 may be configured to verify that the command signal indicates that the friction element 105 is supposed to be in the engaged position. Likewise, if the control processor 130 determines that the slip speed is substantially non-zero, the control processor 130 may verify that the command signal indicates that the friction element 105 is supposed to be in the disengaged position.

The control processor 130 may be configured to identify a failed friction element 105 if the derived slip speed indicates that the friction element 105 did not perform a commanded action (e.g., a shift action).

For instance, one way to diagnose a failed friction element 105 is to determine whether the friction element 105 performed a commanded action. In particular, the control processor 130 may command the friction element 105 to disengage as part of a shift process. As such, the shift process includes a command from the control processor 130 that induces a slip condition. The control processor 130 may further monitor how the friction element 105 responds to the command to disengage. For instance, the control processor 130 may compare the derived slip speed following the command to disengage to a threshold value. The control processor 130 may diagnose the friction element 105 failure based on the derived slip speed relative to the threshold value.

For instance, to induce slip, the control processor 130 may be configured to generate one or more torque signals that direct the driving mechanism 135 and the driven mechanism 140 to rotate at different speeds. If the friction element 105 has failed in the engaged position, the slip speed will remain substantially zero. Therefore, the control processor 130 may be configured to diagnose the friction element 105 failure if the slip speed remains substantially zero after inducing the slip condition. However, if the derived slip speed is a substantially non-zero value after inducing the slip condition, the control processor 130 may be configured to determine that the friction element 105 is working properly.

Instead of comparing the derived slip speed to a threshold value, the control processor 130 may instead compare the slip speed to an expected slip speed. As discussed above, the control processor 130 is configured to generate torque signals that, via the drive unit 110, cause the driving mechanism 135, the driven mechanism 140, or both, to rotate at particular speeds. The control processor 130 may be configured to determine an expected slip speed based on the speeds associated with the torque signals. That is, the control processor 130 may determine the expected slip speed to be the difference between the speeds associated with the torque signals. If the expected slip speed is substantially the same as the actual slip speed (i.e., the slip speed derived from the measured rotational speeds of the driving mechanism 135 and the driven mechanism 140), the control processor 130 may conclude that the friction element 105 is working properly. However, if the expected slip speed is substantially different than the actual slip speed, the control processor 130 may be configured to diagnose the friction element 105 failure.

If the control processor 130 determines that the friction element 105 failure exists, the control processor 130 may be further configured to take remedial action. The type of remedial action may be dictated by the type of friction element 105 failure. For instance, if the control processor 130 determines that the friction element 105 failure is due to the clutch assembly failing in the engaged position, the remedial action may include treating the friction element 105 as a shaft instead of a clutch from the perspective of limiting the available transmission states until the friction element 105 failure is rectified. Another remedial action may include illuminating, for instance, an indicator light on the vehicle dashboard suggesting that the owner have the vehicle serviced as soon as possible. Of course, the control processor 130 may take additional or alternative remedial actions after diagnosing a friction element 105 failure.

In general, computing system and/or devices, such as the control processor 130, may employ any of a number of computer operating systems and generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
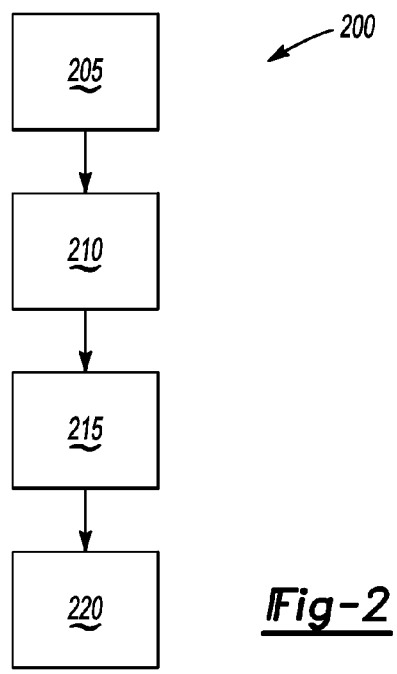
FIG. 2 is a flowchart of an exemplary process that may be implemented by the system of FIG. 1.

FIG. 2 illustrates an exemplary flowchart of a process 200 that may be implemented by the system 100 illustrated in FIG. 1.

At block 205 the rotational speed of, for instance, the driving mechanism 135 of the friction element 105 is measured. For example, the speed sensor 125 may be operatively disposed on or near the driving mechanism 135 to directly or indirectly measure the rotational speed of the driving mechanism 135. The speed sensor 125, therefore, may measure the rotational speed of the plate or shaft of the driving mechanism 135. Further, the speed sensor 125 may generate the measured speed signal that represents the rotational speed measured by the speed sensor 125.

At block 210 the rotational speed of, for instance, the driven mechanism 140 of the friction element 105 is measured. If the friction element 105 includes the clutch assembly, a speed sensor 125 may be operatively disposed on or near the driven mechanism 140 to measure the rotational speed of the driven mechanism 140. Alternatively, if the friction element 105 includes the brake assembly, the rotational speed of the driven mechanism 140 may be assumed to always be zero.

At block 215 the system 100 derives the slip speed based on the difference between the measured rotational speeds of the driving mechanism 135 and the driven mechanism 140. In one exemplary implementation, the control processor 130 may derive the slip speed.

At block 220 the system diagnoses a friction element 105 failure based on the derived slip speed. The control processor 130 may diagnose the friction element 105 failure using any of the exemplary techniques discussed below with respect to FIGS. 3-5.

Figure 3:
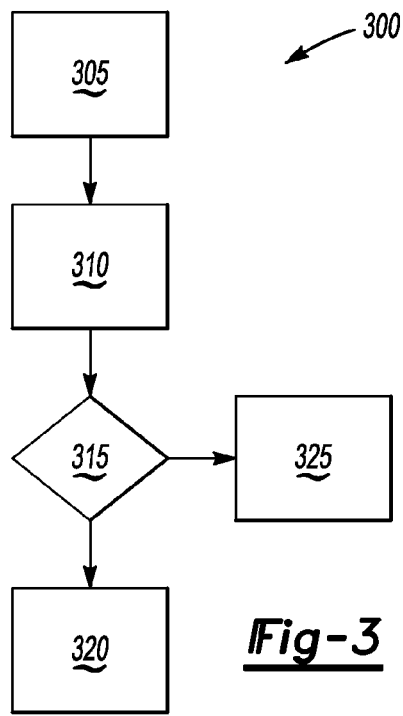
FIG. 3 is a flowchart of an exemplary process that may be implemented by the control processor of FIG. 1 to diagnose a friction element failure.

FIG. 3 is a flowchart of an exemplary process 300 that may be used by the control processor 130 to diagnose the friction element 105 failure.

At block 305 the intended position from the control processor 130 is received. For instance, the control processor 130 is configured to generate the command signal that represents the intended position and transmit the command signal to the hydraulic system 115, and in particular, to the actuator 150 within the hydraulic system 115. When operating properly, the hydraulic system 115 causes the friction element 105 to move into the intended position.

At block 310 the system 100 identifies the actual position of the friction element 105 based on the slip speed. As discussed above, the control processor 130 may determine that the friction element 105 is in the engaged position if the slip speed is substantially zero or that the friction element 105 is in the disengaged position if the slip speed is a substantially non-zero value.

At decision block 315 the system 100 compares the intended position of the friction element 105 to the actual position of the friction element 105 to determine if the intended position and the actual position are the same. If the control processor 130 concludes that the intended position and the actual position are the same, the control processor 130 may determine that no friction element 105 failure exists as indicated at block 320. However, if the control processor 130 concludes that the intended position is different than the actual position, the control processor 130 may determine that the friction element 105 failure exists and take remedial action as indicated at block 325.

Figure 4:
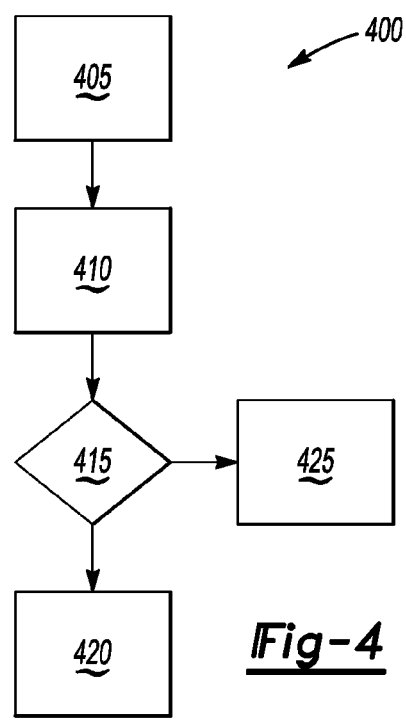
FIG. 4 is a flowchart of another exemplary process that may be implemented by the control processor of FIG. 1 to diagnose a friction element failure.

FIG. 4 is a flowchart of another exemplary process 400 that may be used by the control processor 130 to diagnose the friction element 105 failure.

At block 405 the system 100 induces a slip condition. For instance, the control processor 130 may generate one or more torque signals to attempt to cause the driving mechanism 135 and the driven mechanism 140 to rotate at different speeds, causing a slip speed with a non-zero value. The induced slip condition may be part of a shift process.

At block 410 the system 100 derives the slip speed after inducing the slip condition. In one exemplary approach, the speed sensors 125 may measure the rotational speeds of the driving mechanism 135 and the driven mechanism 140, and transmit measured speed signals representing the measured speeds to the control processor 130. The control processor 130 may determine the actual slip speed based on the difference between the measured rotational speeds.

At decision block 415 the system 100 determines whether the slip speed is zero after the slip condition was induced during the shift process. If the slip speed is a non-zero value, the control processor 130 may conclude that the friction element 105 is working properly as indicated at block 420. However, if the control processor 130 determines that the slip speed is substantially zero, the control processor 130 may diagnose the friction element 105 failure and take remedial actions as indicated at block 425.

Figure 5:
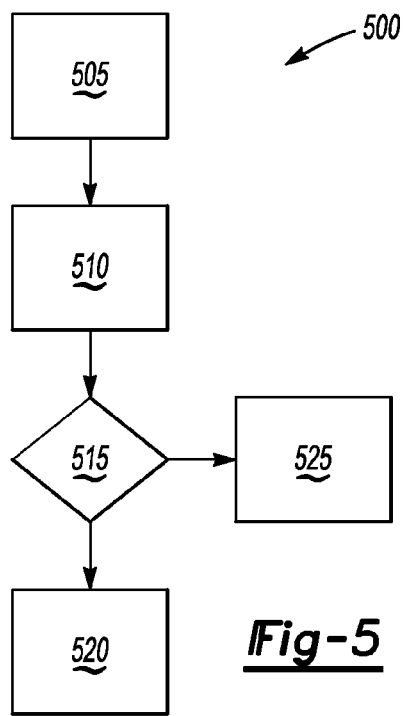
FIG. 5 is a flowchart of yet another exemplary process that may be implemented by the control processor of FIG. 1 to diagnose a friction element failure.

FIG. 5 is a flowchart of yet another exemplary process 500 that may be used by the control processor 130 to diagnose the friction element 105 failure.

At block 505 at least one torque signal is generated. In one exemplary implementation, the control processor 130 may generate one or more torque signals and transmit the torque signals to the drive unit 110.

At block 510 the expected slip speed is determined from the torque signals. As discussed above, each torque signal is associated with a rotational speed. Thus, the control processor 130 may determine the expected slip speed from the one or more torque signals generated.

At decision block 515 the system 100 determines whether the derived slip speed is different than the expected slip speed. If not, the control processor 130 may determine that the friction element 105 is working properly as indicated at block 520. However, if the derived slip speed is substantially different than the expected slip speed, the control processor 130 may conclude that the friction element 105 as failed and take an appropriate remedial action, as indicated at block 525.

While the best modes for carrying out the invention have been described in detail, those familiar with the art to which this invention relates will recognize various alternative designs and embodiments for practicing the invention within the scope of the appended claims.

The invention claimed is:

1. A system comprising:
a friction element having a driving mechanism and a driven mechanism, wherein the driving mechanism and the driven mechanism are selectively engageable with and disengageable from each other during a shift process, and wherein at least one of the driving mechanism and the driven mechanism is configured to rotate;
a drive unit configured to provide a torque to at least one of the driving mechanism and the driven mechanism; and
a control processor configured to diagnose a failure of the friction element based on a derived slip speed defined by the difference between rotational speeds of the driving mechanism and the driven mechanism, wherein the control processor is further configured to:
induce a slip condition as part of the shift process by transmitting a torque signal to the drive unit commanding different rotational speeds from the driving and driven mechanisms; and
diagnose the friction element failure if the derived slip speed is substantially zero after inducing the slip condition.

2. A system as set forth in claim 1, wherein the control processor is configured to derive the slip speed and determine that the driving mechanism is engaged with the driven mechanism if the derived slip speed is substantially zero.

3. A system as set forth in claim 1, wherein the control processor is configured to transmit at least one torque signal to the drive unit to cause the driving mechanism to rotate at a different speed than the driven mechanism to induce the slip condition.

4. A system as set forth in claim 1, further comprising a first sensor configured to measure the rotational speed of the driving mechanism and a second sensor configured to measure the rotational speed of the driven mechanism.

5. A system as set forth in claim 1, wherein the drive unit includes a first torque actuator configured to provide a torque to the driving mechanism and a second torque actuator configured to provide a torque to the driven mechanism.

6. A system as set forth in claim 1, wherein the control processor is configured to determine an intended position of the driving mechanism relative to the driven mechanism and generate a command signal representative of the intended position.

7. A system as set forth in claim 6, further comprising a hydraulic system operatively connected to the friction element and in communication with the control processor, wherein the hydraulic system is configured to receive the command signal and cause the driving mechanism to at least one of engage and disengage the driven mechanism based on the command signal.

8. The system of claim 1, wherein the friction element is one of a clutch and a brake in a vehicle transmission.

9. A system comprising:
a friction element having a driving mechanism and a driven mechanism, wherein at least one of the driving mechanism and the driven mechanism is configured to rotate, and wherein the driving mechanism and the driven mechanism are selectively engageable with and disengageable from each other;
a drive unit configured to provide a torque to at least one of the driving mechanism and the driven mechanism;
at least one sensor configured to directly or indirectly measure the rotational speed of at least one of the driving mechanism and the driven mechanism; and
a control processor configured to:
induce a slip condition as part of a shift process by transmitting a torque signal to the drive unit commanding different rotational speeds from the driving and driven mechanisms;
determine an expected slip speed between the driving and driven mechanisms in response to the induced slip condition;
derive a slip speed from the rotational speeds measured by the at least one sensor;
compare the derived slip speed to the expected slip speed; and
diagnose a failure of the friction element based on a difference between the derived slip speed and the expected slip speed.

10. A system as set forth in claim 9, wherein the control processor is configured to diagnose the friction element failure if the measured slip speed is substantially different than the expected slip speed.

11. A system as set forth in claim 9, wherein the control processor is configured to determine that the friction element is working properly if the derived slip speed is substantially the same as the expected slip speed.

12. A system as set forth in claim 9, wherein the drive unit includes a first torque actuator configured to provide a torque to the driving mechanism and a second torque actuator configured to provide a torque to the driven mechanism.

13. A system as set forth in claim 9, wherein the control processor is configured to determine an intended position of the driving mechanism relative to the driven mechanism and generate a command signal representative of the intended position.

14. A system as set forth in claim 13, further comprising a hydraulic system operatively connected to the friction element and in communication with the control processor, wherein the hydraulic system is configured to receive the command signal and cause the driving mechanism to at least one of engage and disengage the driven mechanism based on the command signal.

15. A diagnostic system comprising:
at least one speed sensor configured to measure a rotational speed of at least one of a driving mechanism and a driven mechanism of a friction element, wherein the driving mechanism and the driven mechanism are selectively engageable with and disengageable from each other; and
a control processor in communication with the at least one speed sensor, and configured to diagnose a failure of the friction element based on a derived slip speed defined by a difference between the rotational speed of the driving mechanism and the rotational speed of the driven mechanism;
wherein the control processor is further configured to:
transmit a torque signal commanding different rotational speeds from the driving and driven mechanisms to thereby induce a slip condition as part of a shift process; and
diagnose the friction element failure if the derived slip speed is substantially zero after inducing the slip condition.

16. A diagnostic system as set forth in claim 15, wherein the control processor is configured to determine that the driving mechanism is engaged with the driven mechanism if the derived slip speed is substantially zero.

17. A diagnostic system as set forth in claim 15, wherein the control processor is configured to diagnose that the friction element is working properly if the derived slip speed is a substantially non-zero value after inducing the slip condition.

18. A diagnostic system as set forth in claim 15, wherein the control processor is configured to diagnose the friction element failure if the derived slip speed is substantially zero after inducing the slip condition.

19. A diagnostic system as set forth in claim 15, wherein the control processor is configured to transmit at least one torque signal to a drive unit to cause one portion of a friction element to rotate at a different speed than another portion of the friction element to induce the slip condition.

20. The diagnostic system as set forth in claim 15, wherein the friction element is a clutch, and wherein:
the at least one speed sensor includes a first and second speed sensor each configured to measure a rotational speed of the driving and driven mechanism, respectively;
the rotational speeds of the driving and driven mechanisms are provided via a first and a second motor, respectively; and
the control processor induces the slip condition as part of a shift process in which torque is transmitted from the driving mechanism to the driven mechanism to thereby cause the driven mechanism and the driving mechanism to rotate at different speeds.

* * * * *